Jan. 25, 1949. H. HERITIER 2,460,176
CLAMP FOR RODS AND TUBULAR MEMBERS
Filed Sept. 10, 1945

Inventor,
Henri Héritier.
By Young, Emery & Thompson
Attys.

Patented Jan. 25, 1949

2,460,176

UNITED STATES PATENT OFFICE 2,460,176

CLAMP FOR RODS AND TUBULAR MEMBERS

Henri Héritier, Geneva, Switzerland

Application September 10, 1945, Serial No. 615,334
In Switzerland October 26, 1944

1 Claim. (Cl. 287—54)

This invention relates to clamps for assembling longitudinal rod and tube members, particularly for tubular metal constructions.

An object of this invention is to provide a clamp of this type which includes a cradle for gripping each of the longitudinal members, each cradle having two parts between which the longitudinal rod and tube member is received and between which extend two bars cooperating with the sides of the cradle to clamp the longitudinal member in place.

Another object of this invention is to provide a clamp for assembling longitudinal rod and tube members comprising cradles for receiving each of the longitudinal members, a pair of bars cooperating with each cradle for containing the longitudinal members therein and cooperating cam surfaces between each bar and its cradle operable upon movement of one bar of the pair in one direction and upon movement of the other bar in the opposite direction longitudinally of the member in the cradle to cause said bars to grip the member, whereby movement of the bar longitudinally in either direction of the member will effect a tightening of one of the bars to jam the longitudinal member in its cradle.

The annexed drawing shows, by way of examples, two forms of construction of the clamp which is the object of the invention.

Figure 1:
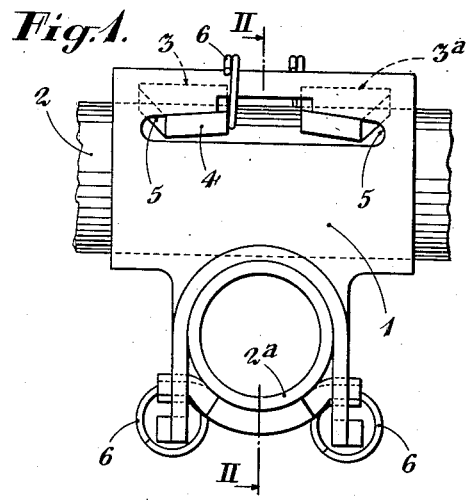
Figure 1 is a front view of the clamp of this invention.
Figure 2:
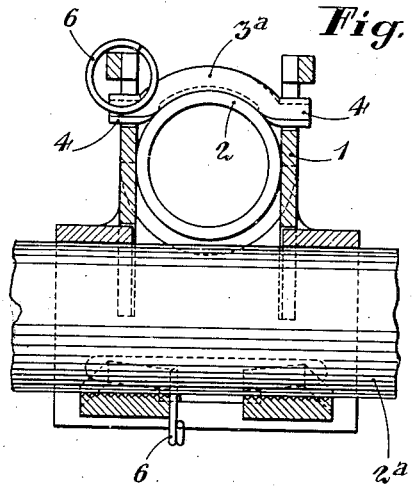
Fig. 2 is a section on line II—II of Fig. 1.
Figure 3:
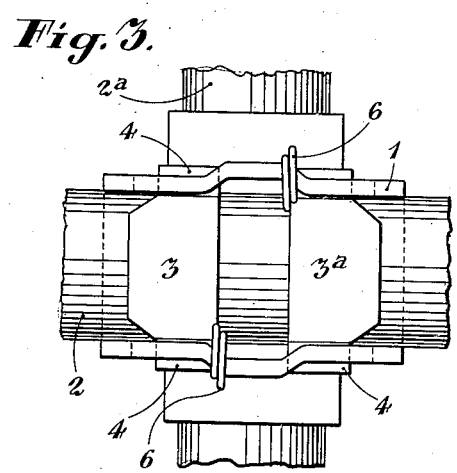
Fig. 3 is a horizontal view.

In the form of construction shown in Figures 1-3, cradle 1 is in the form of a U-shaped element, between the legs of which is positioned the longitudinal rod or tube member to be clamped. As clearly shown in the drawings, each leg of the U-shaped element is provided with a slot 5, the upper or outer surface of which is inclined to form a cam surface. It will be noted that the cam surface at one end of the slot is inclined in one direction and the cam surface at the other end of the slot is inclined in the other direction.

Extending through the slots 5 are wings 4, each wing being inclined to cooperate with the corresponding cam surface formed in the upper portion of the slot 5. The wings 4 are carried by two bars 3 and $3^a$. The bars with the associated wings form wedges cooperating with the cam surfaces in the slots 5. A longitudinal rod or tube member 2 may be inserted in the cradle 1 when the bars 3 and $3^a$ are moved toward each other. After the longitudinal member 2 is placed in the cradle 1, the bars 3 and $3^a$ may be driven apart by striking them with a hammer or other device. The cooperation between the cams on the upper surfaces of the slots 5 and the wings 4 serves to wedge the bars 3 and $3^a$ against the longitudinal members 2 to grip the same in the cradle 1.

After clamping the longitudinal member 2 in the cradle 1, any tendency of the longitudinal member to move longitudinally in the cradle 1 will effect the tightening of one of the bars 3 or $3^a$. Any tendency of the longitudinal member 2 to move in the opposite direction will effect the tightening of the other bar. This construction ensures that the longitudinal rod or tube member will always be tightly gripped in the cradle by one or the other of the bars 3 or $3^a$.

The clamping is simply realized by hammer blows on the bars 3, $3^a$ but a cam device, for instance, might be arranged to separate one of these parts from the other.

The surfaces of contact of the bars 3, $3^a$ with the longitudinal members are preferably ribbed.

In the form of construction shown by Figures 1 to 3, which includes the assembling of two bars 2, $2^a$, the cradle 1 is welded to a similar cradle which is perpendicular to it.

The parts 1, 3, $3^a$ are, preferably, made of cut and stamped metal.

Metal wire rings 6 prevent the parts 3, $3^a$ from detaching themselves when they are in the open position of the clamp, the wings being clear from their housings.

Figure 4:
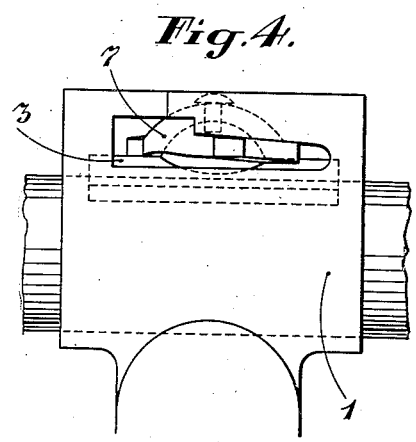
Fig. 4 is a front view of a modified form of clamp.
Figure 6:
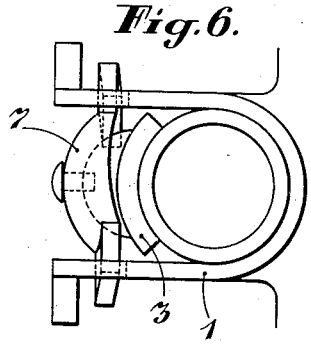
Fig. 6 is a side view.
Figure 5:
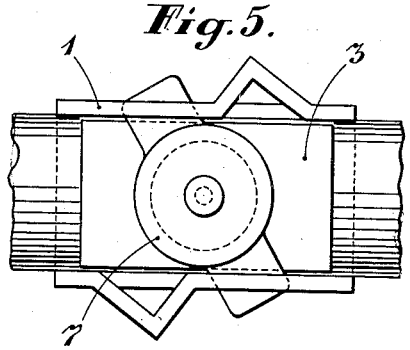
Fig. 5 is a horizontal view.

In the form of construction shown by the Figures 4 to 6, the clamping is obtained by means of a lock 7 capable of swinging on a part 3, each of the ends of said lock going and jamming into one of the housings having an inclined surface of a part 1.

What I claim as my invention and desire to secure by Letters Patent of the United States is:

A clamp for assembling longitudinal rod and tube members which members cross each other at an angle without intersecting each other comprising a cradle for receiving each longitudinal member, a pair of bars cooperating with each cradle for retaining the longitudinal member therein, and cooperating cam surfaces between each bar and its cradle operable upon movement of one bar of the pair in one direction and upon movement of the other bar in the opposite direction longitudinally of the member in the cradle to cause said bars to grip the member, whereby movement of the bar longitudinally in either direction in its cradle will effect a tightening of one of said bars.

HENRI HÉRITIER.

REFERENCES CITED

The following references are of record in the file of this patent:

UNITED STATES PATENTS

| Number | Name | Date |
|---|---|---|
| 426,401 | Tehnik | Apr. 22, 1901 |
| 1,232,447 | Horne | July 3, 1917 |
| 1,644,513 | Davis | Oct. 4, 1927 |
| 1,727,038 | Rousey | Sept. 3, 1929 |
| 2,152,891 | Kohnke | Apr. 4, 1939 |

FOREIGN PATENTS

| Number | Country | Date |
|---|---|---|
| 24,353 | Great Britain | Dec. 14, 1894 |